United States Patent [19]
Boudry

[11] 4,047,159
[45] Sept. 6, 1977

[54] DATA TRANSMISSION SYSTEMS

[75] Inventor: Michael Robert Boudry, London, England

[73] Assignee: U.S. Philips Corporation, New York, N.Y.

[21] Appl. No.: 594,066

[22] Filed: July 8, 1975

[30] Foreign Application Priority Data

July 30, 1974 United Kingdom ............... 33587/74

[51] Int. Cl.² .............................................. G06F 3/04
[52] U.S. Cl. .................................... 364/900; 340/150
[58] Field of Search ............... 340/172.5, 150, 152 R; 445/1

[56] References Cited
U.S. PATENT DOCUMENTS

| | | | |
|---|---|---|---|
| 3,308,439 | 3/1967 | Tink et al. ......................... | 340/172.5 |
| 3,407,387 | 10/1968 | Looschen et al. ............. | 340/172.5 X |
| 3,618,037 | 11/1971 | Wollum et al. .................... | 340/172.5 |
| 3,665,406 | 5/1972 | Gallagher et al. ................ | 340/172.5 |
| 3,693,161 | 9/1972 | Price et al. ......................... | 340/172.5 |
| 3,810,101 | 5/1974 | Avery ................................. | 340/172.5 |

Primary Examiner—Mark E. Nusbaum
Attorney, Agent, or Firm—Frank R. Trifari; Daniel R. McGlynn

[57] ABSTRACT

A data transmission system for interfacing a computer with a plurality of data sources which are in groups, each group at an individual remote location, comprising local interface apparatus for the computer and remote interface apparatus for each remote location, wherein individual sending and receiving means at the local apparatus are provided for connection by a two-wire channel to sending and receiving means at each remote apparatus, wherein the local apparatus includes a buffer for each channel to receive input data words one at a time in bit serial form its respective channel, means for polling each buffer in turn until a buffer having an input data word is located when polling stops, and means responsive to an input by the computer of an input data word from a buffer to clear that buffer, send an acknowledge word in bit serial form to the respective remote location and restart the polling.

11 Claims, 10 Drawing Figures

DATA TRANSMISSION SYSTEMS

This invention relates to data transmission systems for interfacing a computer with remote locations, for example laboratory experiments.

The data output from experimental instruments is commonly an analog signal recorded on a chart, or digital data which may be typed out or recorded on punched tape. Manual manipulation of chart-recorded data is often tedious and rarely uses all the information available, and many instruments now produce digital data ar rates that are too fast for a tape punch, or in quantities too great for punched paper tape based data loggers.

It is economic to supply individual instruments with a small dedicated computer with a fixed program written in assembly code, where the original raw date has to be treated in a standard manner. However, in many experimental situations the data treatment is not fixed, or the outputs of several instruments must be combined for the final computation. This can only be done conveniently in a computer with expensive peripherals such as visual display units, fast printer, disk stores etc. This can be achieved using a distribution system which allows raw data to be collected directly from instruments (or from their dedicated computers) at a shared central computer, but there are many practical and economic problems in the design of such systems.

Commercial systems are known, such as CAMAC and MIOS, which overcome some of these problems. CAMAC is an internationally accepted standard modular technique for interfacing instruments to computers; it is published as an international standard by the EEC under specification EUR 4300; it is also now accepted in the United States as an IEEE technical standard.

MIOS stands for mass input and output system, and is a proprietary interface system marketed by N. V. Philips in Eindhoven, The Netherlands. None of them however satisfies the need for a flexible, low-cost system in which experiments at a number of remote locations can share the resources of a central computer, with data transfer rates ranging from a single command to a maximum comparable with the processing speed of the computer.

According to one aspect of the present invention there is provided a data transmission system for interfacing a computer with a plurality of data sources which are in groups, each group at an individual remote location, including local interface apparatus for the computer and remote interface apparatus for each remote location, in which individual sending and receiving means at the local apparatus are provided for connections by a two-wire channel to sending and receiving means at each remote apparatus, in which the local apparatus includes a buffer for each channel to receive input data words one at a time in bit serial form from its respective channel, means for polling each buffer in turn until a buffer having an input data word is located when polling stops, and means responsive to an input by the computer of an input data word from a buffer to clear that buffer, send an acknowledge word in bit serial form to the respective remote location and restart the polling, and in which each remote apparatus includes means responsive to the receipt of an acknowledge word to start means for polling each data source in its group in turn, and means for stopping the polling when a data source having data to send is located and for enabling means to send an input data word corresponding to said data in bit serial form to the local apparatus.

The radial nature of this system contributes to its flexibility and the use of bit serial transmission over only a two-wire channel connecting the computer with each remote location is a major low-cost factor. The incorporation in the system of a polling strategy in which at both the local and remote interface apparatus polling only stops when data is located and then resumes after only one data word has been accepted enables the efficient reception at the computer of data at varying intervals with varying rates from the remote locations.

Local interface apparatus for a computer which incorporates its part of the polling strategy as described above can be connected to any compatible remote location. As one example, the remote location may include another computer with interface apparatus similar to the local interface apparatus for the first computer.

According to another aspect of the invention there is thus provided apparatus for interfacing a computer with a plurality of channels each connected to an individual remote location, said apparatus including input multiplexing means, a plurality of buffers connected to the input multiplexing means and each adapted to store one input data word at a time received from a remote location over a channel individual to that buffer, a polling module adapted to supply the address of each channel in turn both to the input multiplexing means and to the computer, a READY line which is activated by a buffer having an input data word when its channel address is supplied by the polling module whereby the polling module is stopped and the computer is correspondingly informed that an input data word present in a buffer is available for input via the input multiplexing means and informed also of the channel address of that data word, a RELEASE line which is activated by the computer when it has input an input data word from a buffer whereby that buffer is cleared and the polling module is started, and means for transmitting an acknowledge signal, if appropriate, over the channel from whose buffer an input data word has just been input so as to inform the remote location that it may send another input data word.

A preferred feature of the above described apparatus is that each buffer includes a deserializer adapted to convert an input data word received in bit serial form from its individual remote location into parallel form for input to the computer, and that said means for transmitting an acknowledge signal includes a serializer, or a plurality of serializers one for each channel, the or each serializer being adapted to transmit in bit serial form the acknowledge signal in the form of an acknowledge data word which has been located into it in parallel form.

The above apparatus can also be utilized for sending output data words from the computer to the remote locations, and so a further preferred feature of the apparatus is that output means are provided for sending output data words from the computer to the remote locations, said output means including output multiplexing means, said serializer or serializers which is or are also adapted to transmit output data words, a bus to which the computer can apply an output data word, a bus to which the computer can apply the channel address of an output data word, and a LOAD line which the computer can activate to enable the or the appropriate serializer, to send a data word which is on the output data bus to the remote location designated on the output channel address bus.

The invention will now be described in more detail with reference to the accompanying drawings, in which.

GENERAL DESCRIPTION

Figure 1:
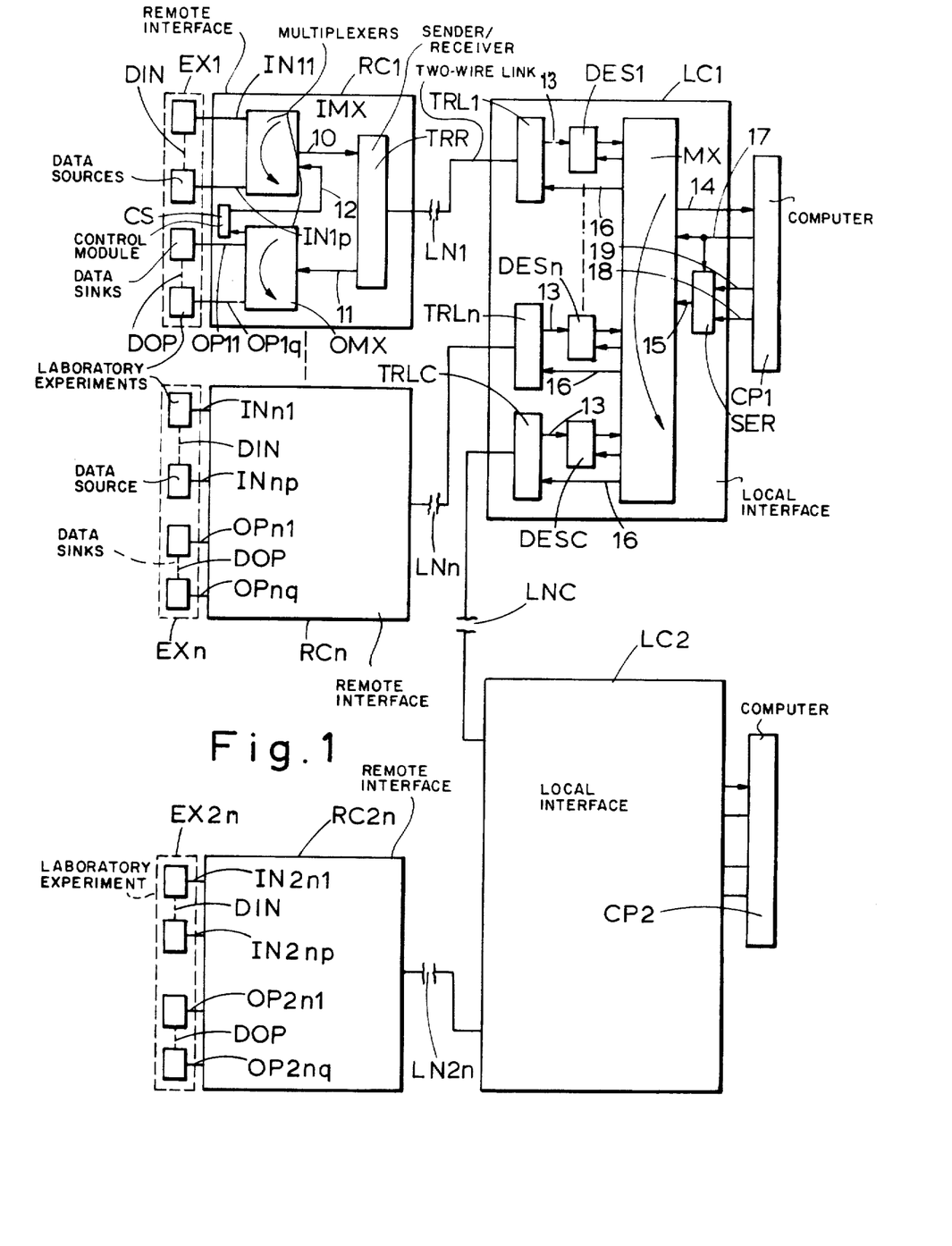
FIG. 1 shows a system connecting two computers to each other and to a plurality of remotely-located laboratory experiments.

Referring now to FIG. 1, two computers, CP1 and CP2, are connected to each other and to a plurality of remotely-located laboratory experiments EX1, . . . EXn, EX2n by a data transmission system. An example of such computer is the Honeywell DDP 516, (whose interface structure is described in the DDP-516 General Purpose Computer Interface Manual, October, 1969, Doc. No. 130071624C, M-964, Honeywell, Computer Control Division) incorporated herein by reference. This system consists of local interface apparatus LC1 and LC2 at the computers CP1 and CP2 respectively, remote interface apparatus RC1, . . . RCn, RC2n at the experiments EX1, . . . EXn, EX2n respectively, two-wire channels LN1 . . . LNn linking the local interface apparatus LC1 to the remote interface apparatus RC1, . . . RCn, a two-wire channel LN2n linking the local interface apparatus LC2 to the remote interface apparatus RC2n, and a two-wire channel LNC linking the local interface apparatus LC1 to the local interface apparatus LC2. Each laboratory experiment EX1 . . . EXn, EX2n can have up to $p$ data source DIN and up to $q$ data sinks DOP. The data sources DIN are linked to their respective remote interface apparatus RC1, . . . RCn, RC2n by individual input sub-channels (IN11 . . . IN1p) . . . (INn1 . . . INnp), (IN2n1 . . . IN2np), and the data sinks DOP are linked to their respective remote interface apparatus RC1, . . . RCn, RC2n by individual output sub-channels (OP11 . . . OP1q) . . . (OPn1 . . . OPnq), (OP2n1 . . . OP2nq).

The remote interface apparatus RC1, . . . RCn, RC2n are identical and so only one of them, RC1, is shown in detail. Each of the input sub-channels IN11 . . . IN1p is connected to a data line 10 and hence to the sender of a duplex sender/receiver TRR when input multiplexing means IMX has the appropriate input sub-channel address. The receiver of the duplex sender/receiver TRR is connected to a data line 11 and hence to one of the output sub-channels OP11 . . . OP1q or to a control sub-channel module CS when output multiplexing means OMX has the appropriate output sub-channel address or the control sub-channel address.

The input sub-channels IN11 . . . IN1p are polled in turn by a polling module (not shown) via the input multiplexing means IMX. When an input sub-channel is addressed whose data source DIN has data to send, polling stops and one data word is sent in bit serial form over the two-wire channel LN1 to the local interface apparatus LC1. When the computer CP1 has input that data word, an acknowledge data word is sent back in bit serial form from the local interface apparatus LC1 over the two-wire channel LN1 to the remote interface apparatus RC1. The acknowledge data word includes the appropriate sub-channel address which routes it via the output multiplexing means OMX to the control sub-channel module CS. Receipt of the acknowledge data word in the control sub-channel module CS activates a clear line 12 which causes the polling module to resume polling the input sub-channels IN11 . . . IN1p via the input multiplexing means IMX.

If at any time the computer CP1 has information to send to one of the data sinks DOP connected to the remote interface apparatus RC1, it sends an output data word in bit serial form from the local interface apparatus LC1 over the two-wire channel LN1 to the remote interface apparatus RC1. The output data word includes the appropriate sub-channel address which routes it via the output multiplexing means OMX to the appropriate one of the output sub-channels OP11 . . . OP1q.

The local interface apparatus LC1 and LC2 are identical and so only one of them, LC1, is shown in detail. Each one of the two-wire links LN1 . . . LNn, LNC is connected to an individual duplex sender/receiver TRL1 . . . TRLn, TRLC, the receiver part of which is connected to an individual buffer DES1 . . . DESn, DESC by its own data line 13. When multiplexing means MX has the appropriate channel address, one of the buffers DES1 . . . DESn, DESC is connected by a data line 14 to the computer CP1 and a serializer, SER is connected by a data line 15 to the sending part of the associated one of the duplex sender/receivers TRL1 . . . TRLn, TRLC via its own data line 16.

The buffers DES1 . . . DESn, DESC can each store data words one at a time whenever they are received in bit serial form from a respective remote interface apparatus RC1 . . . RCn or from the local interface apparatus LC2, and they are polled in turn by a polling module (not shown) via the multiplexing means MX. Polling stops when the multiplexing means has the channel address appropriate to one of the buffers DES1 . . . DESn, DESC if that buffer has a data word stored in it. When the computer CP1 has input that data word via the data line 14, a release line 17 is activated which causes the serializer SER to transmit an acknowledge data word via het data line 15 and via the data line 16 and the send part of the duplex sender/receiver TRL1 . . . TRLn, TRLC associated with the buffer whose data word has just been input. Activation of the release line 17 also clears the buffer whose data word has just been input and the polling resumes.

If at any time the computer CP1 has information to send to a data sink DOP connected to one of the remote interface apparatus RC1 . . . RCn or to the computer CP2, the polling module is interrupted and the channel address appropriate to the link LN1 . . . LNn, LNC which is required is applied to the multiplexing means MX. An output data word, which includes an appropriate sub-channel address, is supplied by the computer CP1 to the serializer SER via the data line 18 and is hence transmitted over the appropriate link. Polling of the buffers DES1 . . . DESn, DESC is then resumed.

An inhibit line 19 is provided in the local interface apparatus LC1 and LC2 for the case of information transfer between the computers CP1 and CP2. An output word from the computer CP1 will be sent via the serializer SER and sender part of the sender/receiver TRLC over the link LNC to a buffer in the local interface apparatus LC2. When polling within the apparatus LC2 stops at that buffer, the data word will be input by the computer CP2 which will then activate its release line 17 and an acknowledge data word will be sent back over the link LNC to be received in the buffer DESC of the apparatus LC1. When polling within the apparatus LC1 stops at the buffer DESC, the acknowledge data word will be input by the computer CP1. The computer CP1 must be programmed so that in response to the input of an acknowledge data word it not only activates the release line 17 to clear the buffer DESC but also activates the inhibit line 19 to prevent the serializer SER from transmitting an acknowledge data word. Transfer of an output data word from the computer CP2 to the computer CP1 takes place by a process exactly similar to that just described.

The manner in which the above described data transmission system provides access to the computer CP1 for all the data sources DIN of the experiments EX1 ... EXn on an equitable time-sharing basis will now be explained by reference to three types of situation.

Suppose, in the first type of situation, that all the data sources DIN of all the experiments EX1 ... EXn have, at the same time, information to send to the computer CP1. Polling of the input multiplexing means IMX in all the remote apparatus RC1 ... RCn will stop, for example on input sub-channels IN11, IN21 ... INn1 respectively, and an input data word will be sent to each of the buffers DES1 ... DESn in the local apparatus LC1. Polling of the multiplexing means MX will result in these input data words being input by the computer CP1 in turn, for example in the order DES1 ... DESn if polling stops first at the buffer DES1. After input by the computer CP1 of an input data word from each buffer DES1 ... DESn, an acknowledge data word is sent each time over the corresponding link LN1 ... LNn which causes polling of the input sub-channels to be resumed in the corresponding apparatus RC1 ... RCn. For example, after input by the computer CP1 of an input data word from the input sub-channel IN11, an input data word will be sent from the input sub-channel IN12 to the buffer DES1; polling of the multiplexing means MX will by that time have moved on to the buffer DES2 and so the input multiplexing means IMX of the apparatus RC1 will stay locked on input sub-channel IN12 until polling of the multiplexing means MX returns to the buffer DES1. Thus data is input by the computer CP1 one word at a time from each of the data sources DIN, with all the data sources DIN being polled in sequence in the order (IN11, IN21 ... INn1), (IN12, IN22 ... INn2), ... (IN1p, IN2p ... INnp).

Suppose, in the second type of situation, that only one data source DIN, for example the source on the input sub-channel IN11, has information to send at a fast rate. Also suppose that the computer CP2 does not have information to send to the computer CP1. In this case, after the computer CP1 has input a data word from the sub-channel IN11, the input sub-channels IN12 ... IN1p are polled at the apparatus RC1 without any of them indicating that they have data to send and then the next data word from the input channel IN11 is sent to the buffer DES1. At the apparatus LC1 the buffers DES2 ... DESn, DESC are polled without any of them being found to have a data word stored in them, and so this next data word is input from the buffer DES1 with very little delay.

Suppose, in the third type of situation, that one data source DIN, for example the source on the input sub-channel IN11, has information to send at a fast rate, and another data source DIN, for example the source on the input sub-channel INn1, has information to send at a slow rate. In this case, the data input to the computer CP1 from the fast input sub-channel IN11 will be as fast as if it were the only active input sub-channel except for the occasional delay by the time taken to input one data word from the slow input sub-channel INn1 when that input sub-channel has a data word to send. Also the delay imposed on the slow input sub-channel INn1 whenever it has a data word to send is only the necessary polling time together with the time taken to input one data word from the fast input sub-channel IN11.

In the above described data transmission system it is assumed that all the data sinks DOP of the experiments EX1 ... EXn are ready to receive information from the computer CP1 at any time. Thus no timing restrictions are placed on this direction of information transfer. Whenever the computer CP1 has information to send, the input polling process of the local apparatus LC1 is interrupted to send an output data word to the appropriate remote apparatus RC1 ... RCn, and the sub-channel address in this data word routes it through the output multiplexing means OMX to the designated data sink DOP.

Some practical details of an example of how a system as described above with reference to FIG. 1 can be realized are as follows.

Making use of computers which have a 4-bit function field in their input/output instructions, the number of links which can be attached to each computer is chosen to be 16. Each data word is chosen to include 12 bits of information and a 4-bit sub-address. The 12 information bits accommodate, for example, analog-to-digital converted signals having a range of 1 to 4000, or 3 binary-coded-decimal digits. The 4-bit sub-address is chosen so that the remote end of each link to a computer can be terminated in up to 16 input sub-channels and up to 15 output sub-channels plus the control sub-channel. Transmission could be at a speed of up to 160,000 data words per second at a 5 MHz bit rate over each link which can be a coaxial cable up to 500 meters in length.

Using TTL logic, the multiplexing means at both the remote and local interface apparatus can be polled at the rate of 250 ns per channel, i.e. 4 $\mu$us for a complete poll of 16 channels. The time taken for input of a data word from a data source to a computer, assuming that no other data source is active, is made up of the time taken for polling at the remote end, transmission to the local end, polling at the local end, input by the computer, and transmission back to the remote end of an acknowledge data word. Allowing 45 $\mu$us for response and input by the computer, this time is approximately 60 $\mu$us, which corresponds to a maximum input rate of 16,000 words per second. The maximum output rate is simply the transmission rate of 160,000 words per second.

In practice, the limiting average date rates are set by the rate at which the computer can sort out the incoming data, do something with it and generate output information. With a particular computer and software which we have used, the maximum input rate from all experiments together is about 8000 words per second. This total rate can be made up, however, of data from one or two fast and several slower experiments simultaneously. In the output direction (such as when driving a remote storage display) the peak transfer rate can be as high as 30,000 words per second.

As has been described above with reference to FIG. 1, the system can also be used for communication between computers. This means that the system can grow to meet increased demands by the addition of more processors without change to the basic hardware structure. Since the inter-computer links can be used to transmit programs as well as data, only one of the computers in the network need have a full set of peripherals and facilities for program development. This is advantageous since price trends in the mini-computer field are such that basic processors with memory are becoming very cheap indeed, but peripherals are likely to remain expensive.

A particular example of a system which we have used includes two computers: a small foreground computer and a large central computer with comprehensive peripherals. The local interface apparatus at the foreground computer has links connecting it to remote interface apparatus at a number of experiments and also a link connecting it to a local interface apparatus at the central computer. The central computer can be used to develop and edit programs for the foreground computer and for additional processing or filing of data obtained from the experiments connected to the foreground computer. The local interface apparatus at the central computer also has links connecting it to remote interface apparatus at individual experiments and trial systems. This set-up with two computers has been used in applications ranging from non-dispersive X-ray spectrometry to simple curve fitting.

DETAILED DESCRIPTION

Figure 2:
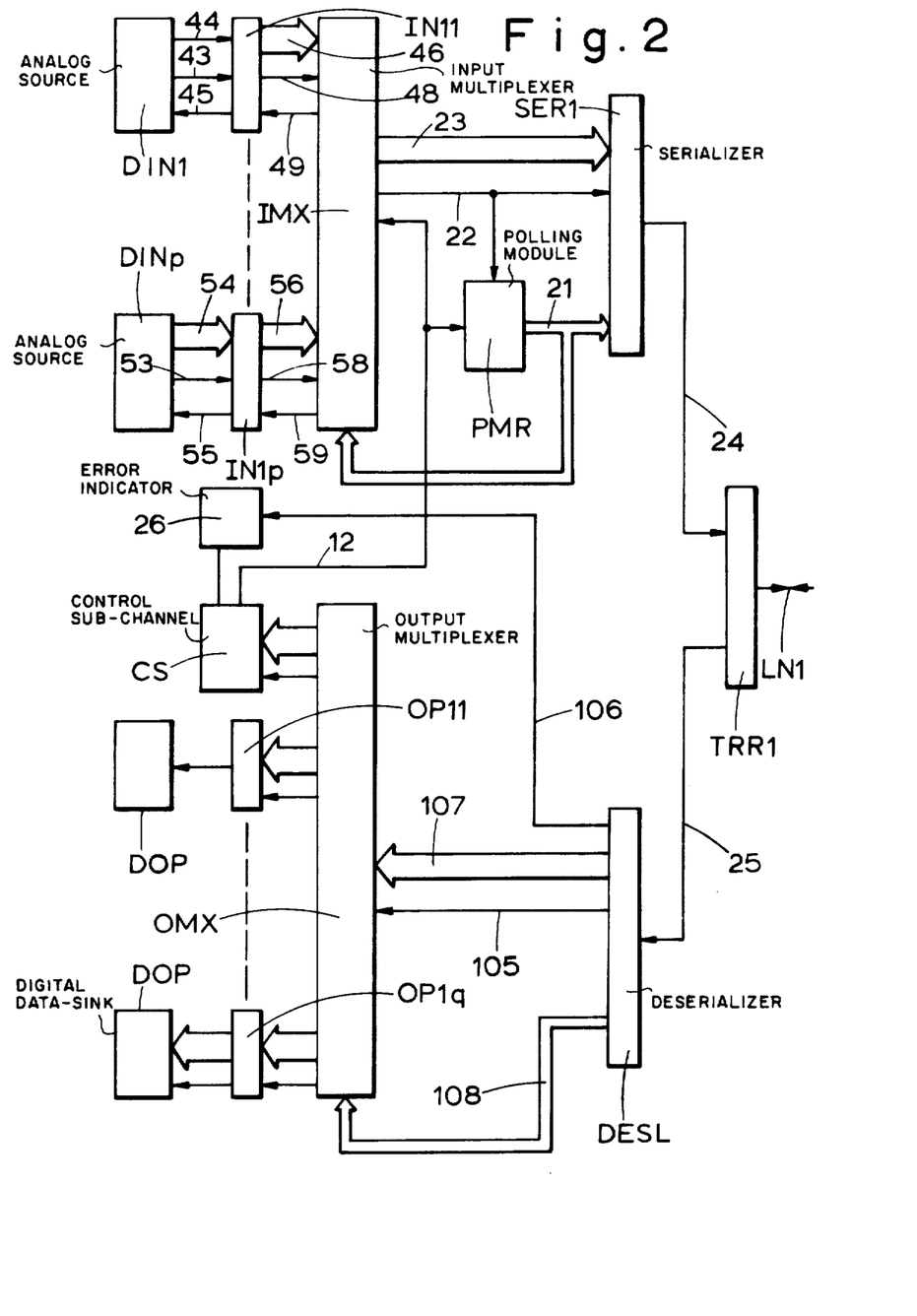
FIG. 2 shows in more detail the remote interface apparatus shown in FIG. 1.
Figure 3:
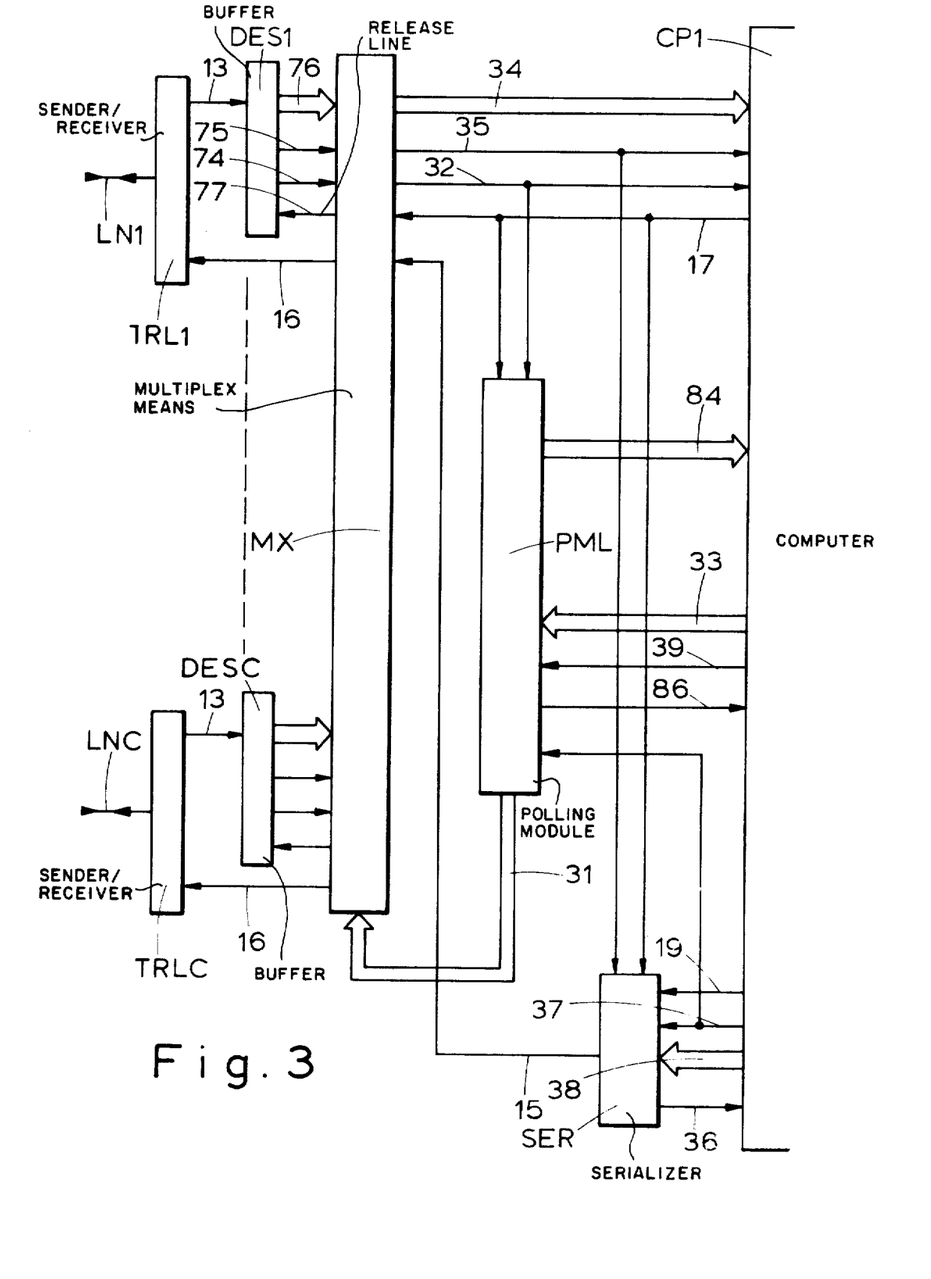
FIG. 3 shows in more detail the local, i.e. computer, interface apparatus shown in FIG. 1, FIGS. 4 and 5 show in more detail the input sub-channel modules.

Referring back to FIG. 1, a remote interface apparatus RC1 and a local interface apparatus LC1 are shown in some detail and their manner of operation has been outlined with reference to the detail shown in that Figure. The remote interface apparatus is shown in more detail in FIG. 2, and the local interface apparatus is shown in more detail in FIG. 3. Some parts of the remote and local interface apparatus shown in FIGS. 2 and 3 are shown in even greater detail in FIGS. 4 to 10. The remote and local interface apparatus shown in FIGS. 2 to 10 will now be described by the sequence of events which occurs for input of a data word from an input sub-channel of the remote interface apparatus to the computer attached to the local interface apparatus, i.e. "input operation," and then by the sequence of events which occurs for output of a data word from the computer to an output sub-channel of the remote interface apparatus, i.e. "output operation."

INPUT OPERATION

Figure 4:
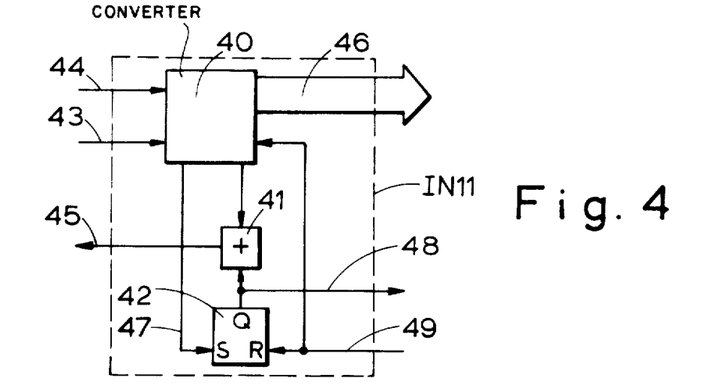

FIG. 2 shows an analogue data source DIN1 linked to the input multiplexing means IMX of the remote interface apparatus by an analogue input sub-channel module IN11 of the remote apparatus. FIG. 4 shows the module IN11 in more detail comprising an analogue-to-digital converter 40, an OR gate 41 and a set-reset flip-flop 42. Referring to FIGS. 2 and 4 together, a signal from the source DIN1 on the LOAD line 43 starts conversion by the converter 40 of an analog signal from the source DIN1 on the line 44. When the converter 40 starts conversion it provides a signal through the OR gate 41 on a BUSY line 45 which indicates to the source DIN1 that it cannot be asked to start another conversion. When conversion is complete the digital data is available on a 12-bit bus 46 and a signal on a line 47 sets the flip-flop 42 which activates a READY line 48 and also provides a signal to the OR gate 41 to maintain the signal on the BUSY line 45. When the data on the bus 46 has finally been input by the computer and an acknowledge data word received back at the remote apparatus, there will be a signal on a CLEAR line 49 which will clear the converter 40 and also reset the flip-flop 42, thus de-activating the READY line 48 and removing the signal from the BUSY line 45.

Figure 5:
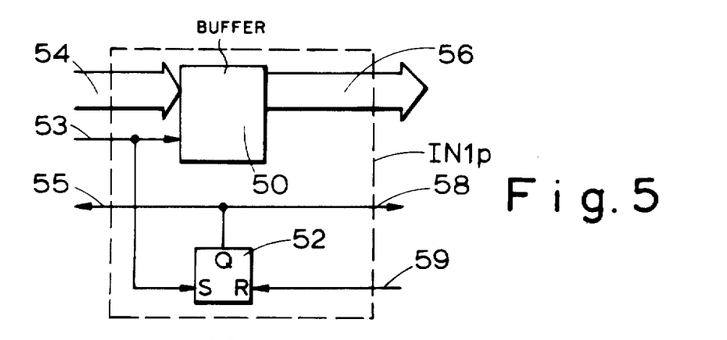

FIG. 2 also shows a digital data source DINp linked to the multiplexing means IMX by a digital input sub-channel module IN1p. FIG. 5 shows the module IN1p in more detail comprising a digital buffer 50 and a set-reset flip-flop 52. Referring to FIGS. 2 and 5 together, a signal from the source DINp on a LOAD line 53 loads data from the source DINp on a 12-bit bus 54 into the buffer 50 so that it is available on a 12-bit bus 56. The signal on the LOAD line 53 also sets the flip-flop 52 which activates a READY line 58 and provides a signal on the BUSY line 55. When the data on the bus 56 has finally been input by the computer and an acknowledge data word received back at the remote apparatus, there will be a signal on a CLEAR line 59 which will reset the flip-flop 52, thus de-activating the READY line 58 and removing the signal from the BUSY line 55. It can be noted that if the digital data source DINp can retain its information until it has been input by the system, then the buffer 50 is redundant and only the flip-flop 52 is necessary.

In the examples of input sub-channel modules shown in FIGS. 4 and 5, the function of the BUSY line is to indicate to the respective data source when the system has fully dealt with the last piece of information and can accept the next piece of information from that source, thus setting the rate at which information can be accepted from that source. The actual rate will depend on the speed with which the whole system is polled and how busy the rest of the system is.

Another example of an input sub-channel module is a box having control push-buttons, operation of which sends a data word to the computer. In this case it is possible to do without the BUSY line, i.e. receipt of a signal on the module's CLEAR line de-activates its READY line, then some time later the computer sends an output word which is received on an output sub-channel to inform the operator that he may operate a control push-button again.

Referring back to FIG. 2, a polling module PMR, consisting essentially of a 4-bit counter, provides each of the 16 possible input sub-channel addresses in turn on a 4-bit address bus 21 both to the input multiplexing means IMX and to a serializer SER1. When the polling module PMR supplies the address of an input sub-channel whose READY line, e.g. line 48 of sub-channel module IN11, is active, then the READY line 22 is activated via the input multiplexing means IMX which stops the polling module PMR.

The following signals are then present at the serializer SER1:

i. The information on the 12-bit data bus of the input sub-channel at which polling has stopped, e.g. bus 46 of sub-channel IN11, via the input multiplexing means IMX on a 12-bit data bus 23;

ii. the 4-bit address of the input sub-channel at which polling has stopped on the address bus 21; and delayed slightly (by means not shown) to allow signals (i) and (ii) to stabilize;

iii. the active signal on the READY line 22.

The active signal on the READY line 22 causes the serializer SER1 to transmit a 16-bit input data word, consisting of the 12 data bits and the 4 address bits, in bit serial form on the line 24 and hence via the sending part of a duplex sender/receiver TRR1 over the two-wire channel LN1 to the local apparatus at the computer CP1. It should be mentioned that the serializer SER1, the duplex sender/receiver TRR1 and a deserializer DESL, whose function will be described later, make up the duplex sender/receiver TRR shown in FIG. 1.

Figure 6:
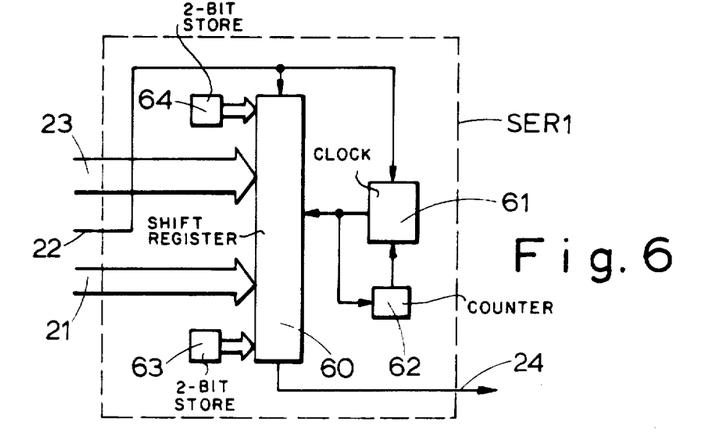
FIG. 6 shows in more detail the input serializer respectively, of the remote interface apparatus shown in FIG. 2, FIGS. 7, 8 and 9 show in more detail an input deserializer, the polling module and the output serializer, respectively, of the local interface apparatus shown in FIG. 3.

Referring now to FIG. 6, the serializer SER1 comprises a shift register 60, a clock 61, a counter 62, and means 63 and 64 which respectively hold header and trailer 2-bit fixed codes. The active READY line 22 loads the shift register 60 with the data bits on the bus 23, the address bits on the bus 21 and the header and trailer bits, and starts the clock 61. The output of the clock 61 shifts the information from the shift register 60 on to the line 24 in serial form and also goes to the counter 62 which stops the clock 61 after the required number of counts.

Referring now to FIGS. 1 and 3 together, the two-wire links LN1 and LNC, the duplex sender/receivers TRL1 and TRLC, the buffers DES1 and DESC with their own data lines 13, the multiplexing means MX and the serializer SER of the local interface apparatus LC1, and the computer CP1 shown in FIG. 1 are also shown in FIG. 3. Thus a data input word transmitted from remote interface apparatus in bit serial form over the link LN1 is received, via the receiving part of the duplex sender/receiver TRL1, in the buffer DES1.

Figure 7:
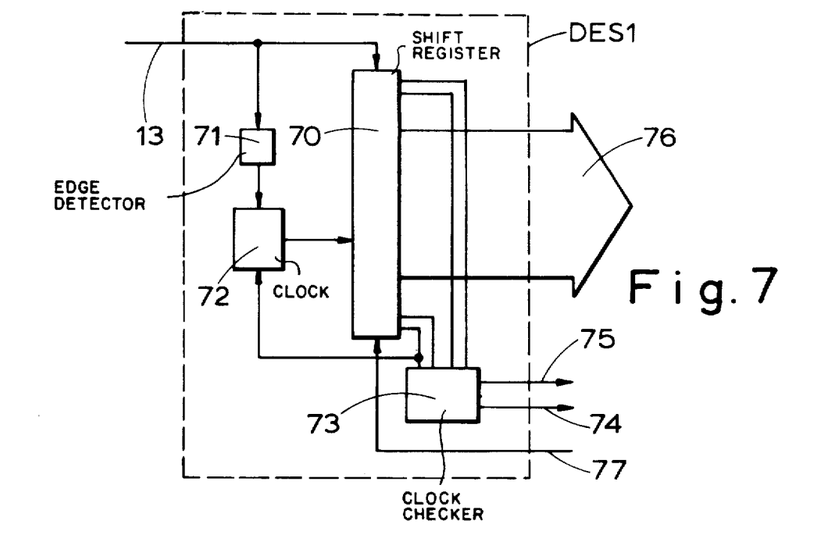

Referring now to FIG. 7, the buffer DES1 comprises a shift register 70, an edge detector 71, a clock 72, and a code checker 73. The first bit of an input data word received over the data line 13, i.e. the first bit of the 2-bit header code, is detected by the edge detector 71 whose output starts the clock 72. The output of the clock 72 shifts the register 70 and so allows it to receive the first and following bits of the input data word. When the whole input data word is in the shift register 70, the first bit of the 2-bit header code reaches the last bit of the shift register 70 and changes its state, which stops the clock 72. The code checker 73 will then respond to the header and trailer bits to activate the READY line 74, and will activate the valid line 75 if the result of the code check on the header and trailer bits is positive. Also, the 12 data bits and 4 address bits of the input data word will be available on the 16-bit data bus 76. When the input data word on the data bus 76 has been input by the computer CP1 there will be a signal on the RELEASE line 77 which will clear the shift register 70 to make it ready to receive another input data word.

Referring back to FIG. 3, a polling module PML provides each of 16 possible input channel addresses in turn on a 4-bit multiplexer address bus 31 to the multiplexing means MX. When the polling module PML supplies the channel address of a buffer whose READY line, e.g. line 74 of buffer DES1, is active, then the READY line 32 is activated via the multiplexing means MX which stops the polling module PML.

Figure 8:
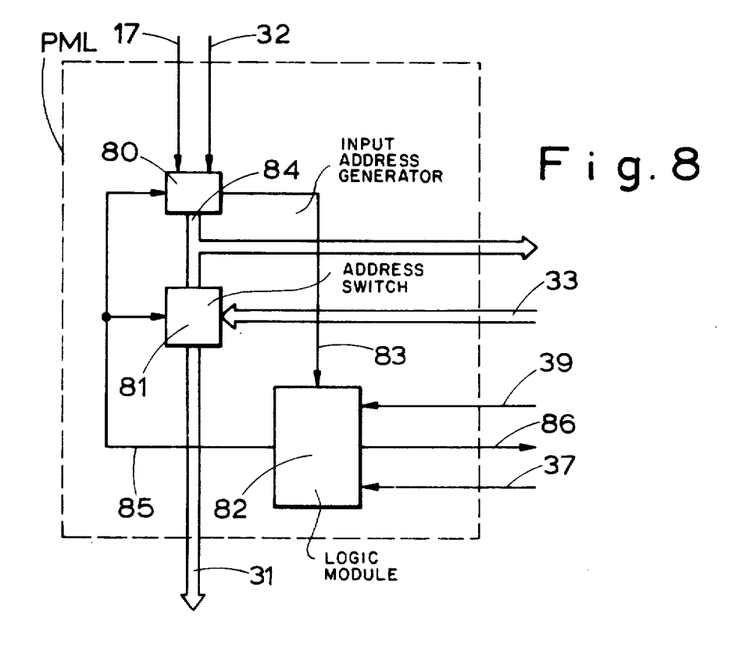

Referring now to FIG. 8, the polling module PML comprises an input address generator 80, an address switch 81 and a logic module 82. The condition of the input address generator 80 is continuously supplied on the line 83 to the logic module 82. The active READY line 32 stops the input address generator 80, consisting essentially of a 4-bit counter, which makes the input address at which it has stopped available to the computer CP1 on the 4-bit input address bus 84. If the logic module 82 does not then supply a signal on its output line 85 due to the computer CP1 wishing to send an output data word to a remote location, the address on the input address bus 84 is supplied via the address switch 81 to the multiplexer address bus 31. A signal on the output line 86 at this stage would temporarily switch the address switch 81 to an output address supplied by the computer CP1 on the 4-bit output address bus 33.

Referring back to FIG. 3, as was stated in the penultimate paragraph, activation of the READY line 32 stops the polling module PML. The following information is then available to the computer CP1:

i. the information on the 16-bit data bus of the buffer at which polling has stopped, e.g. bus 76 of buffer DES1, via the multiplexing means MX on a 16-bit data bus 34, ii. the 4-bit address of the buffer at which polling has stopped, on the input address bus 84, iii. the condition of the VALID line of the buffer at which polling has stopped, e.g. VALID line 75 of buffer DES1, via the multiplexing means MX on a VALID line 35, and iv. the active signal on the READY line 32.

The computer CP1 may at this time be engaged in activity which must not be interrupted, e.g. the sending of an output data word, and may choose to ignore for the time being the activated READY line 32. When it is ready, the computer CP1 will respond to the activated READY line 32 and, in due course, taking note of the information on the VALID line 35 and the input address bus 84, input the input data word on the data bus 34. When the computer CP1 has performed the input, and provided a BUSY line 36 of the serializer SER is not active due to it still sending a previously output data word from the computer CP1 to a remote location, it will activate a RELEASE line 17. This causes the serializer SER to transmit an acknowledge data word, or a modified acknowledge data word according to the condition of the VALID line 35, via the data line 15 and via the data line 16 and the send part of the duplex sender/receiver associated with the buffer whose input data word has just been input, e.g. the sender/receiver TRL1 associated with the buffer DES1, back to the remote location from whence the input data word came. It should be noted that the data line 15, the data line 16, and the RELEASE line 17 are as shown in FIG. 1.

Figure 9:
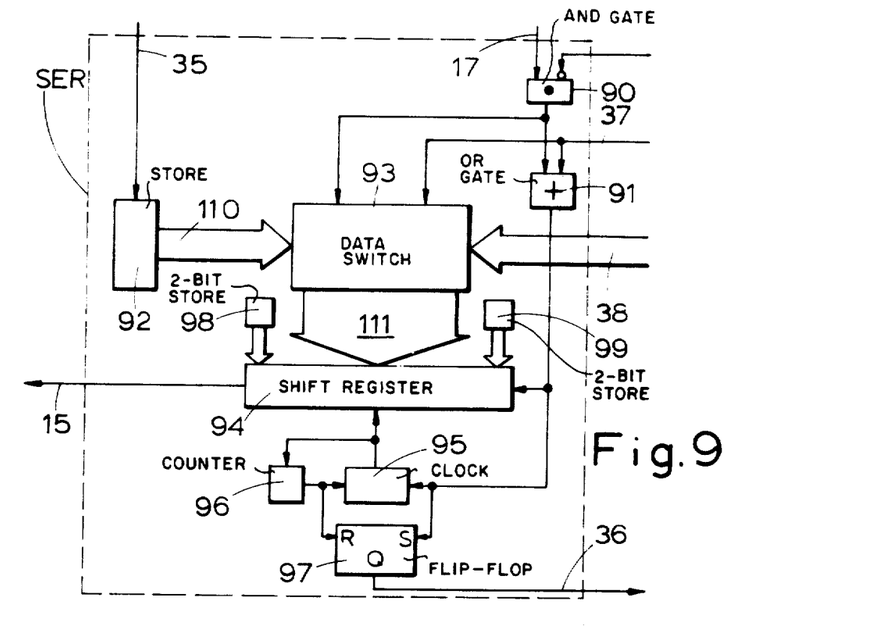

Referring now to FIG. 9, the serializer SER comprises an AND gate 90, an OR gate 91, means holding an acknowledge data word 92, a data switch 93, a shift register 94, a clock 95, a counter 96, a set-reset flip-flop 97 and means 98 and 99 which respectively hold header and trailer 2-bit fixed codes. The active signal on the RELEASE line 17 is passed by the AND gate 90 provided the INHIBIT line 19 (which it may be noted is as shown in FIG. 1) is not activated by the computer CP1 due to the input data word having been an acknowledge data word received from the local interface apparatus of another computer in response to an output data word sent from the computer CP1 to that other computer. If the active signal on the RELEASE line 17 is passed by the AND gate 90, then it makes an acknowledge data word, or a modified acknowledge data word if the condition of the VALID line 35 indicates that the input data word was not valid, stored in the holding means 92 and available on the 16-bit data bus 110, available via the data switch 93 on the 16-bit data bus 111 to the shift register 94. An active signal on the RELEASE line 17 and passed by the AND gate 90 is also passed by the OR gate 91 to load the shift register 94, start the clock 95 and set the set-reset flip-flop 97 which activates the BUSY line 36. The active BUSY line 36 will inform the computer, in this case, not to activate the LOAD line 37. If the LOAD line 37 has been previously activated it would also have resulted in the BUSY line 36 being activated, in this case to inform the computer not to activate the RELEASE line 17. The output of the clock 95 shifts the acknowledge data word from the shift register 94 on to the data line 15 in serial form and also goes to the counter 96 which, after the required number of counts, stops the clock 95 and resets the flip-flop 97 to de-activate the BUSY line 36.

In a possible alternative arrangement of the serializer SER, there need not be an acknowledge data word holder 92 and data switch 93. Instead, the acknowledge data word, or modified acknowledge data word, is generated as required in response to the RELEASE line 17 by an encoding network connected to the counter 96.

Referring back to FIG. 3, activation of the RELEASE line 17 also activates, via the multiplexing means MX, the RELEASE line of the buffer from which an input data word has just been input, e.g. the RELEASE line 77 of the buffer DES1, which clears the shift register of that buffer (see FIG. 7) to make it ready to receive another input data word. Activation of the RELEASE line 17 then causes the polling module PML to resume providing each of the 16 possible input channel addresses in turn, starting from the address at which it had been stopped, on the address bus 31 (see FIG. 8) to the multiplexing means MX until it supplies the channel address of the next buffer whose READY line is active.

Referring now to FIG. 2, an acknowledge data word sent in bit serial form from the local interface apparatus at the computer CP1 over the link LN1 in response to the input at the computer CP1 of an input data word from one of the data sources DIN1 . . . DINp will be received, via the receiver part of the duplex sender/receiver TRR1 and the line 25, in the deserializer DESL.

Figure 10:
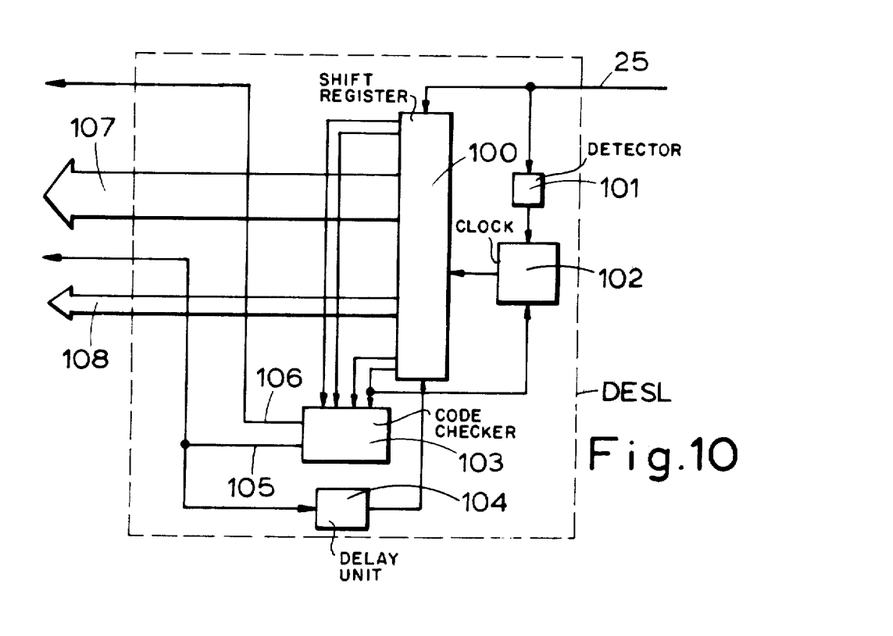
FIG. 10 shows in more detail the output deserializer of the remote interface apparatus shown in FIG. 2.

Referring now to FIG. 10, the deserializer DESL comprises a shift register 100, an edge detector 101, a clock 102, a code checker 103 and a delay unit 104. The first bit of an acknowledge data word received over the line 25, i.e. the first bit of the 2-bit header code, is detected by the edge detector 101 whose output starts the clock 102. The output of the clock 102 shifts the register 100 and so allows it to receive the first and following bits of the acknowledge data word. When the whole acknowledge data word is in the shift register 100, the first bit of the 2-bit header code reaches the last bit of the shift register 100 and changes its state, which stops the clock 102. The code checker 103 will then respond to the header and trailer bits to activate the STROBE line 105, and will activate the INVALID line 106 if the result of the code check on the header and trailer bits is negative. Also the 12 data bits in the acknowledge data word will be available on the data bus 107 and the 4 address bits in the acknowledge data word, which will be appropriate to the control sub-channel, will be available on the address bus 108. After a suitable delay imposed by the delay unit 104, the activated STROBE line 105 will clear the shift register 100 to make it ready to receive another data word from the computer CP1 over the link LN1.

Referring back to FIG. 2, for the time during which the acknowledge data word is held in the deserializer DESL, the control sub-channel address on the address bus 108 will make the data on the data bus 107 and the signal on the STROBE line 105 available via the output multiplexing means OMX to the control sub-channel CS. The control sub-channel CS will recognize the acknowledge data word and activate a CLEAR line 12. The active signal on the CLEAR line 12 will be made available via the input multiplexing means IMX, which has been locked since a data word was sent, to the CLEAR line of the input sub-channel module from which that data word has just been input at the computer CP1, e.g. the CLEAR line 49 of the input sub-channel module IN11, thus de-activating its READY line 48 and removing the signal from its BUSY line 45. The active signal on the clear line 12 will then cause the polling module PMR to resume providing each of the 16 possible input sub-channel addresses in turn on the address bus 21 to the input multiplexing means IMX until it next supplies the address of an input sub-channel whose READY line is active, when it stops. It should be noted here that the output multiplexing means OMX, the control sub-channel CS and the CLEAR line 12 are as shown in FIG. 1.

If the computer CP1 receives an invalid input data word and sends back a modified acknowledge data word in response, then the modified acknowledge data word will be received in the deserializer DESL and routed to the control sub-channel CS in the same manner as an acknowledge data word. The control sub-channel CS will activate the CLEAR line 12 as for an acknowledge data word, but it will also signal an error indicator 26. If an invalid acknowledge data word or an invalid modified acknowledge data word is received by the deserializer DESL, then the signal on the STROBE line 105 will be routed to the control sub-channel CS which will activate the CLEAR line 12. The INVALID line 106 will also be activated in either of these two cases and will signal the error indicator 26. The control sub-channel CS is also arranged to activate the CLEAR line 12 and signal the error indicator 26 if a valid acknowledge data word is not received within a preset time; this is to cope with the case where a data word somehow gets lost in the system which would otherwise prevent the polling module PMR from resuming.

Output Operation

Referring first back to FIG. 1, if at any time the computer CP1 has information to send to a data sink DOP connected to one of the remote interface apparatus RC1 . . . RCn or to the computer CP2, it first determines whether the serializer SER is engaged in sending a data word.

Referring now to FIG. 3, when the BUSY line 36 from the serializer SER is not active, the computer CP1 applies the channel output address of the output data word to be sent to the output address bus 33, applies the output data word to be sent to a 16-bit data bus 38, and activates an OUTPUT REQUEST line 39. At a suitable time in the operation of the polling module PML the polling by the polling module PML of the buffers DES1 . . . DESn, DESC is stopped, the address on the output address bus 33 is applied to the multiplexing means MX via the multiplexer address bus 31, and an OUTPUT AVAILABLE line 86 in the polling module PML is activated. As shown in FIG. 8, the logic module 82 responds to the activated OUTPUT REQUEST line 39 when the condition of the input address generator 80 is suitable as indicated on the line 83. The logic module 82 then supplies a signal on its output line 85 which switches the address switch 81 to the output address supplied on the output address bus 33, stops the input address generator 80 and activates the OUTPUT AVAILABLE line 86.

Referring again to FIG. 3, the computer CP1 responds to the activated OUTPUT AVAILABLE line 86 by activating the LOAD line 37 which causes the serializer SER to transmit the output data on the data bus 38 on the data line 15 to the remote location whose output address is designated on the multiplexer address bus 31 via the data line 16 and the send part of the duplex sender/receiver associated with that remote location, e.g. the sender TRL1 connected to the link LN1. As shown in FIG. 9, the activated LOAD line 37 makes the data word on the data bus 38 available to the shift register 94 via the data switch 93 and, via the OR gate 91, loads the shift register 94, starts the clock 95 to initiate shifting of the data word on to the line 15, and sets the flip-flop 97 to activate the BUSY line 36.

Referring again to FIG. 3, the signal on the activated LOAD line 37 also goes to the polling module PML which, after a suitable delay, resumes polling the buffers DES1 . . . DESn, DESC via the multiplexer address bus 31. As shown in FIG. 8, the signal on the LOAD line 37 causes the logic module 82, after a suitable delay, to de-activate its output line 85.

Referring now to FIG. 2, an output data word sent in bit serial form from the local interface apparatus at the computer CP1 over the link LN1 will be received via the receiver part of the duplex sender/receiver TRR1 and the line 25 in the deserializer DESL. The output data word is received in the deserializer DESL in the same manner as has been previously described for an acknowledge data word with reference to FIG. 10. For the time during which the output data word is held in the deserializer DESL, the output sub-channel address contained in that data word will be on the address bus 108 and so make the data part of that data word on the data bus 107 and the signal on the STROBE line 105 available via the output multiplexing means OMX to the designated one of the output sub-channel modules OP11 . . . OP1q. Each one of these sub-channel modules will normally contain a buffer which is loaded by the signal on the STROBE line 105. For example, the module OP11 can be connected to an analogue data sink DOP and will thus contain a digital-to-analogue converter which will convert the data received in its buffer into analogue form. As another example the module OP1q can be connected to a digital data sink DOP and will thus make available the data received in its buffer together with a further strobe signal. However, if a data sink DOP can respond to transient information, i.e. to an output data word for the time during which it is held in the deserializer DESL, the respective sub-channel module need not have a buffer and will only provide means for connection. If an invalid output data word is received by the deserializer DESL, the INVALID line 106 will be activated and will signal the error indicator 26.

It has been assumed in the above description of the output operation that all the destinations for the output data words from the computer CP1 are at all times ready to receive an output data word. If in a particular application this condition were too stringent, it would be possible to associate an output destination that can become overloaded with an input sub-channel and arrange that whenever the output destination becomes ready to receive, the associated input sub-channel sends an appropriate word to the computer. The computer can be programmed to wait for that appropriate input word before sending an output word to that particular destination.

Some possible variations within the scope of the invention of the system described above with reference to and as shown in the drawings will now be discussed.

The described system makes provision for errors to be reported at the remote locations, i.e. the error indicator 26 shown in FIG. 2 will report an error if a modified acknowledge word is received indicating that the computer received an invalid input data word; or if an invalid acknowledge data word, invalid modified acknowledge data word, or invalid output data word is received at the remote location; or if a valid acknowledge word is not received at the remote location within a preset time. This provision for error-reporting is optional. Alternatively the procedure on receipt of an error report could be more elaborate, e.g. so as to provide for re-transmission of an input data word or interruption of the whole system.

In the drawings, the input multiplexing means IMX and the output multiplexing means OMX in the remote interface apparatus and the multiplexing means MX in the local interface apparatus have been shown as if they were integral multiplexing switches. These multiplexing means may alternatively be realized as extended bus-type structures including a data bus and an address bus to which a number of units are permanently connected. In this case each such unit continuously inspects the common address bus and compares it with its own address which is permanently stored in it; a unit is enabled when it recognizes its own address. One advantage of the extended bus structure is that if a unit is enabled by recognizing its own address it is not necessary for that address to remain on the address bus to keep it enabled; it can be latched and then disabled by a later signal from another part of the system. Thus, for example, while a serializer is sending a data word in the above described system the associated polling module could be free to resume polling. Another advantage of the extended bus structure is that for a system in which less than the full complement of possible channels, i.e. 16 in the above described system, is required at a local or remote interface apparatus, then that interface apparatus can be built for less cost than if an integral multiplexing switch having its full complement of channels had to be used. It is intended that in the appended claims the term "multiplexing means" shall include both the integral switch realization and the extended-bus realization.

In a system according to this invention, the sending of an acknowledge signal from the local interface apparatus at a computer in response to each input data word sent from a remote interface apparatus is an essential feature. As described above with reference to FIGS. 3 and 9, the condition of the VALID line 35, as a result of the code check performed on an input data word, causes the local interface apparatus to provide an acknowledge or modified acknowledge data word and also informs the computer of the result of the code check. So long as there is this autonomous generation by the local interface apparatus of an acknowledge or modified acknowledge data word, it is not essential that the computer be informed of the result of the code check. Furthermore, it is not essential that an acknowledge data word be generated autonomously by the local interface apparatus as has been described above with reference to FIGS. 1, 3 and 9. Instead, it is possible to program the computer to provide the acknowledge data word to the local interface apparatus after it has input an input data word. Referring to FIG. 3, the acknowledge data word would be provided by the computer CP1 on the data bus 38 and the RELEASE line 17 and the VALID line 35 would not be connected to the serializer SER. Referring to FIG. 9, the holding means 92 and the data switch 93 would not be required. Also the INHIBIT line 19 would not be required.

As shown in FIGS. 1 and 3, a single serializer SER is provided in the local interface apparatus, the output data line 15 of which is routed via the multiplexing means MX to the sender on the appropriate link. Alternatively, it would be possible to provide a separate serializer for each link, it would be possible to provide a separate serializer for each link, to which the connections from the computer CP1 would be routed via the multiplexing means MX. In the case of autonomous acknowledge data word generation, individual connections from the VALID line and the RELEASE line of the associated buffer would be make to each serializer.

As shown in FIGS. 1 and 3, at the local interface apparatus a single multiplexing means MX is provided on the one hand for connection of the buffers to the computer and on the other hand for connecting the serializer to the senders of the links. Alternatively, it would be possible to provide separate input multiplexing means and output multiplexing means for these two purposes. In this case the address of the buffer at which polling has stopped would always be supplied to the input multiplexing means, but an address switch would be required to provide to to the output multiplexing means either the address of the buffer at which polling has stopped or the address of a channel to which the computer wishes to send an output word.

It may now be mentioned that although the sending of an acknowledge signal from the local interface apparatus at a computer in response to each input data word sent from a remote interface apparatus is an essential feature of the invention, it is not essential to make provision for the computer to send output data words to a remote interface apparatus. If this provision for output data words is not required, then firstly, in the case where a separate serializer is provided for each link, it will be necessary to provide output multiplexing means at the local interface apparatus, whether separate from or combined with input multiplexing means; secondly, it will not be necessary for the sender/receivers at the local and remote interface apparatus to be duplex in operation; thirdly, it will not be necessary to provide an output multiplexing means at the remote interface apparatus; and fourthly, an acknowledge data word need not have the full complement of bits as provided for an output data word but can be in a shortened form containing only as much information as is necessary for its particular function.

Although bit serial transmission is essential to a data transmission system according to one aspect of this invention, being a major low-cost factor, the usefulness of the local interface apparatus is not limited to bit serial transmission but could also be obtained with some form of bit parallel transmission. In this case the acknowledge data word can be replaced by an acknowledge signal communicated on one of the parallel transmission paths from the local interface apparatus.

Local interface apparatus which polls the buffers, one for each link, in turn; stops polling when a buffer is detected which has an input data word; sends an acknowledge signal when the input data word has been input by the computer; and then clears that buffer and resumes polling, constitutes another aspect of the invention. Such local interface apparatus can, however, be connected to any compatible remote location. One example is the connection to a similar local interface apparatus at another computer, e.g. the computer link LC1, LNC, LC2 shown in FIG. 1. Another example is a connection to a remote location which does not have the polling strategy for a number of data sources and/or data sinks as shown in the remote interface apparatus of FIG. 1 but is nevertheless compatible with the polling strategy of the local interface apparatus. Yet another example is a connection to a remote interface apparatus modified from that shown in FIGS. 1, 2, 4, 5, 6 and 10 in that one or more of its input sub-channels includes multiplexing means connected to a plurality of sub-sub-channels which have data sources and are polled in turn, thus providing a three-level system instead of a two-level system.

What is claimed is:

1. An interface system for a computer comprising:
a RELEASE line connected to said computer;
a plurality of data word sources and data word sinks;
a plurality of communications links;
a plurality of remote interface units connected to said data sources and data sinks, each one of said remote interface units connected to a corresponding one of said communications links for transferring data words therebetween via a first I/O sub-channel; each of said remote interface units comprising a serializer and a deserializer for converting said data words between serial and parallel form; an input multiplexer connected to said serializer, and an output multiplexer connected to said deserializer
a local interface unit, connected to said computer and at least one of said communications links for transferring input data words via a plurality of second I/O sub-channels therebetween, and comprising
a plurality of buffers each buffer connected to a corresponding one of said communication links, each buffer comprising a plurality of locations for storing in parallel form a single input data word transferred from one of said data sources and received in bit serial form from one of said corresponding links; said RELEASE line connected to each of said buffers for clearing a first one of said buffers when a RELEASE signal generated by said computer on said RELEASE line is transmitted to said first one buffer, said RELEASE signal being indicative that said computer has received an input data word from said local interface unit; means for polling each of said buffers in turn, and being responsive to the presence of an input data word in a second one of said buffers for temporarily stopping polling of said buffers at said second one of said buffers, said means for polling being connected to said RELEASE line and responsive to said RELEASE signal from said computer to resume polling of said buffers at the next one of said buffers in turn; and transmitting means for transmitting an acknowledge data word in bit serial form to a corresponding one of said remote interface units along a corresponding one of said communications links from whose corresponding buffer an input data word has just been received by said computer for informing said remote interface unit that it may send another input data word to said local interface unit.

2. The system as claimed in claim 1, wherein said transmitting means comprises a serializer comprising a parallel-to-serial shift register for converting into bit serial form an acknowledge data word loaded into said shift register in parallel form; and loading means responsive to said RELEASE signal from the computer for loading an acknowledge data word from said computer into said shift register in parallel form.

3. The system as claimed in claimed 1, wherein said local interface unit further comprises output means connected to said computer for sending output data words from the computer to said remote interface units comprising transmitting means for converting said output data words into bit serial form; a first bus connecting said computer and said transmitting means and to which said computer can apply said output data words; a second bus connected to said computer which the computer can specify the destination of said output data word, and means responsive to a LOAD signal from the computer for enabling the transmitting means to send a data word which is on said first bus to one of said remote interface units designated on the output channel address bus.

4. The system as claimed in claim 3, wherein said local interface unit further comprises duplex receiving and sending means corresponding to each of said communication links so that an input data word can be received over one of said communication links into a corresponding one of said buffers at the same time an output data word is sent over said one communication link from said transmitting means.

5. The system as claimed in claim 3, wherein said transmitting means comprises a serializer comprising a parallel-to-serial shift register for converting into bit serial form said acknowledge data word or said output data words loaded from said first bus into said shift register in parallel form, said serializer comprising loading means for loading an acknowledge data word or an output data word into said shift register in parallel form, responsive to said RELEASE signal or said LOAD signal respectively, from the computer, and said serializer further comprising means for providing a BUSY signal to inform the computer when it is active whereby the computer can delay provision of the RELEASE signal or the LOAD signal as appropriate.

6. The system as claimed in claim 5, further comprising an INHIBIT line connected to said computer, said serializer further comprising inhibiting means responsive to an INHIBIT signal on said INHIBIT line generated by said computer when it recognizes an input data word as being an acknowledge data word for preventing said loading means from loading an acknowledge word into said shift register responsive to said RELEASE signal.

7. The system as claimed in claim 1, wherein each buffer comprises an INVALID signal line connected to said serializer, and code checking means for performing a code check on a received input data word and for providing an INVALID signal on said INVALID signal line in response to the receipt of an INVALID input data word, and wherein said loading means in said serializer is responsive to an INVALID signal on said INVALID signal line from its associated buffer for loading a modified acknowledge data word instead of an acknowledge data word into said shift register in said serializer responsive to said RELEASE signal.

8. The system as claimed in claim 1, wherein said remote interface unit further comprising:

transmitting means for sending an input data word in bit serial form on its corresponding communication link;

means responsive to the receipt of a said acknowledge data word for providing a CLEAR signal; and polling means responsive to said CLEAR signal to start polling each of said data sources associated with the remote interface unit in turn, said polling means being responsive to at least one of said data sources having input data to stop the polling by said polling means and to enable said transmitting means to send an input data word corresponding to said input data of said at least one data source along said corresponding communication link.

9. The system as claimed in claim 8, wherein said polling means in said remote interface unit comprises input multiplexing means having a READY signal input; an input module having a LOAD signal input and a READY signal output, each input module corresponding to one of said data sources and connected to said input multiplexing means, each input module having means responsive to a LOAD signal on said LOAD signal input from its corresponding one of said data sources when that one source has data to send, for providing a READY signal on said READY signal output to the input multiplexing means wherein said polling means in said remote interface apparatus further comprises a polling module for supplying a sub-channel address corresponding to each data source in the group in turn both to the input multiplexing means and to said transmitting means for sending an input data word, said polling module being responsive to said CLEAR signal to start supplying the sub-channel addresses in turn and being responsive to a READY signal provided by an input module when the sub-channel address of that input module is supplied to the input multiplexing means to stop supplying the first I/O sub-channel addresses at the first I/O sub-channel address; and wherein said transmitting means for sending an input data word comprises and means responsive to said READY signal provided by a corresponding input module when the sub-channel address of said corresponding input module is supplied by said polling module to the input multiplexing means for loading the shift register in parallel with an input data word, said input data word constituted by data available via the input multiplexing means and its sub-channel address, and for converting the input data in the register into bit serial form.

10. The system as claimed in claim 9, wherein said means responsive to a LOAD signal from a corresponding one of said data sources provided a BUSY signal to said one data source, and is responsive to a CLEAR signal from said input multiplexing means for removing said BUSY signal.

11. The system as claimed in claim 9, wherein said remote interface unit further comprises output multiplexing means responsive to the receipt of an acknowledge data word transmitted along said corresponding communications link; an output module connected to said output multiplexing means for receiving data words from said corresponding communications link and being responsive to the receipt of a data word for supplying to said output multiplexing means an output sub-channel address contained in an acknowledge data word or an output data word.

* * * * *